United States Patent Office 3,201,470
Patented Aug. 17, 1965

3,201,470
N-2-ALKYNYL-AMINO-BENZOCYCLO-ALKANES
Charles Ferdinand Huebner, Chatham, N.J., assignor to CIBA Corporation, New York, N.Y., a corporation of Delaware
No Drawing. Filed June 19, 1962, Ser. No. 203,436
7 Claims. (Cl. 260—577)

The present invention concerns unsaturated amines. More especially, it relates to benzocycloalkane compounds, in which the cycloalkane portion has from five to seven ring members and is substituted by an N-alkynyl-amino group, in which the triple bond of the alkynyl portion is separated from the nitrogen atom by an alkylene radical, particularly to compounds of the formula

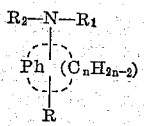

in which Ph stands for an 1,2-phenylene (o-phenylene) radical, the group —($C_nH_{2n-2}$)— is an alkylene radical, which has from three to ten carbon atoms, whereby the alkylene portion betweent the 1-position and the 2-position of the 1,2-phenylene radical has from three to five carbon atoms, and is substituted by the group of the formula

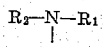

and the group R, $R_1$ is an alkynyl group, in which the triple bond is separated from the nitrogen atom by an alkylene radical, $R_2$ is hydrogen or, more especially, an organic radical, and R is hydrogen, carbocyclic aryl or carbocyclic aryl-lower alkyl, salts thereof, or quaternary ammonium derivatives thereof, as well as process for the preparation of such compounds.

The aromatic portion of the benzocycloalkane ring system, i.e. the 1,2-phenylene radical Ph, is unsubstituted (i.e. Ph stands for an unsubstituted 1,2-phenylene radical), or may be substituted (i.e. Ph is a sustituted 1,2-phenylene radical). Substituents of the latter which may be attached to any position available for substitution, are, for example, lower alkyl, e.g. methyl, ethyl, n-propyl, isopropyl, n-butyl and the like, trifluoromethyl, etherified hydroxyl, particularly lower alkoxy, e.g. methoxy, ethoxy, n-propyloxy, isopropyloxy, n-butyloxy and the like, as well as lower alkenyloxy, e.g. allyloxy, 2-methyl-allyloxy and the like, or lower alkylenedioxy, e.g. methylenedioxy and the like, esterified hydroxyl, especially halogeno (representing hydroxyl esterified with a hydrohalic acid), e.g. fluoro, chloro, bromo and the like, etherified mercapto, particularly lower alkyl-mercapto, e.g. methylmercapto, ethylmercapto and the like, nitro, amino, particularly N,N-di-lower alkyl-amino, e.g. N,N-dimethylamino, N-ethyl-N-methylamino, N,N-diethylamino and the like, as well as N-acylamino, in which acyl radical of an organic carboxylic acid, such as an aliphatic carboxylic acid, particularly lower alkanoic acid, e. g. acetic, propionic, pivalic acid and the like, or any other suitable organic carboxylic acid.

Substituted 1,2-phenylene groups representing Ph are, for example, (lower alkyl)-1,2-phenylene, e.g. (methyl)-1,2-phenylene (such as 3-methyl-1,2-phenylene, 4-methyl-1,2-phenylene, 4,5-dimethyl-1,2-phenylene and the like), (ethyl)-1,2-phenylene (such as 4-ethyl-1,2-phenylene and the like), (n-propyl)-1,2-phenylene (such as 4-n-propyl-1,2-phenylene and the like), (isopropyl)-1,2-phenylene (such as 3-isopropyl-1,2-phenylene and the like), or any other analogous (lower alkyl)-1,2-phenylene radical, (trifluoromethyl-1,2-phenylene (such as 4-trifluoromethyl-1,2-phenylene and the like), (lower alkoxy)-1,2-phenylene, e.g. (methoxy)-1,2-phenylene (such as 3-methoxy-1,2-phenylene, 4-methoxy-1,2-phenylene, 3,4-dimethoxy-1,2-phenylene and the like), (ethoxy)-1,2-phenylene (such as 3-ethoxy-1,2-phenylene, 4-ethoxy-1,2-phenylene, 3,6-diethoxy-1,2-phenylene and the like), (n-propyloxy)-1,2-phenylene (such as 4-n-propyloxy-1,2-phenylene and the like), (isopropyloxy)-1,2-phenylene (such as 3-isopropyloxy-1,2-phenylene and the like), (n-butyloxy)-1,2-phenylene (such as 4-n-butyloxy-1,2-phenylene and the like), or any other analogous (lower alkoxy)-1,2-phenylene radical, (lower alkenyloxy)-1,2-phenylene, e.g. (allyloxy)-1,2-phenylene (such as 3-allyloxy-1,2-phenylene, 4-allyloxy-1,2-phenylene ad the like), or any other analogous (lower alkenyloxy)-1,2-phenylene radical, (lower alkylenedioxy)-1,2-phenylene, e.g. (methylenedioxy)-1,2-phenylene (such as 3,4-methylenedioxy-1,2-phenylene and the like), or any other analogous (lower alkylenedioxy)-1,2-phenylene radical, (halogeno)-1,2-phenylene, e.g. (fluoro)-1,2-phenylene (such as 3-fluoro-1,2-phenylene, 4-fluoro-1,2-phenylene and the like), (chloro)-1,2-phenylene (such as 3-chloro-1,2-phenylene, 4-chloro-1,2-phenylene, 4,5-dichloro-1,2-phenylene, 3,6-dichloro-1,2-phenylene, 3,4,5,6,-tetrachloro-1,2-phenylene and the like), (bromo)-1,2-phenylene (such as 4-bromo-1,2-phenylene, 3,6-dibromo-1,2-phenylene and the like), or any other analogous (halogeno)-1,2-phenylene radical, (lower alkyl-mercapto)-1,2-phenylene, e.g. (methylmercapto)-1,2-phenylene (such as 4-mercapto-1,2-phenylene and the like), (ethylmercapto)-1,2-phenylene (such as 3-ethylmercapto-1,2-phenylene and the like), or any other analogous (lower alkyl-mercapto)-1,2-phenylene radical, (nitro-1,2-phenylene (such as 3-nitro-1,2-phenylene, 4-nitro-1,2-phenylene and the like, (N,N-di-lower alkyl-amino)-1,2-phenylene, e.g. (N,N - dimethylamino)-1,2-phenylene (such as 3-N,N-dimethylamino-1,2-phenylene, 4-N,N-dimethylamino-1,2-phenylene and the like), (N-ethyl-N-methyl - amino)-1,2-phenylene (such as 4-N-ethyl-N-methyl-amino-1,2-phenylene and the like), (N,N-diethylamino)-1,2-phenylene (such as 4-N,N-diethylamino-1,2-phenylene and the like), or any other (N,N-di-lower alkyl-amino)-1,2-phenylene radical, (N-acyl-amino)-1,2-phenylene, such as (N-lower alkanoyl-amino)-1,2-phenylene, e.g. (N-acetylamino)-1,2-phenylene (such as 4-N-acetylamino-1,2-phenylene and the like), (N-pivaloyl-amino)-1,2-phenylene (such as 4-N-pivaloylamino-1,2-phenylene and the like), or any other analogous (N-acyl-amino)-1,2-phenylene radical, or any equivalent substituted 1,2-phenylene radical.

As indicated above, the alkylene portion of the cycloalkane ring, particularly the radical of the formula —($C_nH_{2n-2}$)—, has from three to ten carbon atoms (i.e. the letter $n$ is an integer from 1 to 10), and has from three to five carbon atoms between the 1-position and the 2-position of the 1,2-phenylene radical, and is substituted by the group of the formula

and the group R. The compounds of this invention are, therefore, derivatives of the indane, the 1,2,3,4-tetrahydro-naphthalene and the benzosuberane series. The alkylene radical of the formula —($C_nH_{2n-2}$)— is represented above all by 1,3-propylene, as well as by 1,4-butylene or 1,5-pentylene, and is substituted by the N-alkynyl-amino group. It may be further represented by branched alkylene radicals, e.g. 1-methyl-1,3-propylene, 1,1-dimethyl-1,3-propylene, 1,2-dimethyl-1,3-propylene, 2-ethyl-1,3- propylene, 1-isopropyl-1,3-propylene, 1-methyl-1,4-butylene, 1,1-dimethyl-1,4-butylene, 1,3-dimethyl-1,4-butylene, 4-tertiary butyl-1,4-butylene, 1,2,3-trimethyl-1,4-butylene, 1-methyl-1,5-pentylene, 3-n-propyl-1,5-pentylene and the like, which radicals are subsituted by the N-alkynyl-amino group.

The N-alkynyl amino group, in which the triple bond of the alknyl substituent is separated from the nitrogen atom by an alkylene radical, is advantageously the group of the previously shown formula $$R_2-N-R_1$$

in which $R_1$ is an alkynyl group, in which the triple bond is separated from the nitrogen atom by an alkylene radical, and which has preferably from three to seven carbon atoms, and $R_2$ is hydrogen or an organic radical.

An alkynyl group $R_1$ is particularly an alk-2-ynyl group, which has from three to five carbon atoms, such as a 2-propynyl group, especially 2-propynyl (or propargyl), as well as 1-methyl-2-propynyl, 1,1-dimethyl-propynyl, 3-methyl-propynyl (or 2-butynyl) and the like. Other alkynyl groups, having from three to seven carbon atoms, are for example, 3-butynyl, 1,2-dimethyl-3-butynyl, 3-pentynyl, 3-hexynyl and the like.

The alkynyl substituent in the N-alkynyl-amino may be the only substituent of the amino-nitrogen (i.e. $R_2$ is hydrogen). However, in addition to the alknyl group, it is preferably susbtituted with an organic radical, more especially an aliphatic radical. The latter is above all lower alkyl having from one to seven carbon atoms, particularly methyl, as well as ethyl, n-propyl, isopropyl, n-butyl, secondary butyl, tertiary butyl, n-pentyl and the like; other aliphatic radicals are, for example, lower alkenyl having from two to seven carbon atoms, e.g. allyl, 1-methyl-allyl, 2-methyl-ally, 2-butenyl and the like, lower alkynyl having from three to seven carbon atoms, such as one of the above mentioned radicals, and also include cycloaliphatic radicals, such as cycloalkyl having from three to eight, especially from five to seven, ring carbon atoms, e.g. cyclopropyl, cyclopentyl, cyclohexyl, cyclohepty and the like, cycloalkenyl having from five to eight ring carbon atoms, e.g. 2-cyclopentenyl, 3-cyclopentenyl, 2-cyclohexenyl, 3-cyclohexenyl, 2-cycloheptenyl and the like, and cycloaliphatic-aliphatic radicals, such as cycloalkyl-lower alkyl, in which cycloalkyl has from three to eight, preferably from five to seven, ring carbon atoms, and lower alkyl has from one to seven carbon atoms, e.g. cyclopropylmethyl, 2-cyclopropylmethyl, cyclopentylmethyl, 1-cyclopentylethyl, 2-cyclopentylethyl, cyclohexylmethyl, 2-cyclohexylethyl, cycloheptylmethly and the like, or any other aliphatic, particularly substituted aliphatic radical, such as hydroxy-lower alkyl, e.g. 2-hydroxyethyl and the like, lower alkoxy-lower alkyl, e.g. 2-methoxy-ethyl, 2-ethoxyethyl and the like, or substituted cycloaliphatic radical. Other aliphatic radicals are, for example, carbocyclic aryl-aliphatic radicals, such as phenyl-lower alkyl or substituted phenyl-lower alkyl, in which phenyl is substituted by lower alkyl, e.g. methyl, ethyl, isopropyl and the like, lower alkoxy, e.g. methoxy, ethoxy and the like, halogeno, e.g. fluoro, chloro, bromo and the like, trifluoromethyl or any other substitutent. Other organic radicals representing the additional substituent in an N-alkynyl-N-substituted amino group are, for example, carbocyclic aryl, such as phenyl or phenyl substituted by one of the above substituents, or any other suitable organic radical.

Apart from being substituted by an N-alkynyl-amino group, the cycloalkane portion of the benzocycloalkane ring system is preferably unsubstituted, i.e. in the above formula the radical $-(C_nH_{2n-2})-$ is an unbranched alkylene radical and R stands for hydrogen. However, it may also be substituted, for example, by lower alkyl, i.e. in the above formula the radical $-(C_nH_{2n-2})-$ is a branched alkylene radical and R stands for hydrogen, or by carbocyclic aryl or carbocyclic aryl-lower alkyl, i.e. in the above formula the radical $-(C_nH_{2n-2})-$ stands for an unbranched alkylene radical and R is carbocyclic aryl or carbocyclic aryl-lower alkyl, or by carbocyclic aryl or carbocyclic aryl-lower alkyl and lower alkyl, i.e. in the above formula the radical $-(C_nH_{2n-2})-$ is a branched alkylene radical and R stands for carbocyclic aryl or carbocyclic aryl-lower alkyl. Carbocyclic aryl is above all phenyl or substituted phenyl having one or more than one of the same or different substituents, such as lower alkyl, e.g. methyl, ethyl, n-propyl, isopropyl and the like, lower alkoxy, e.g. methoxy, ethoxy, n-propyloxy, isopropyloxy and the like, halogeno, e.g. fluoro, chloro, bromo and the like, amino, N,N-di-lower alkyl-amino, e.g. N,N-dimethylamino, N,N-diethylamino and the like, trifluoromethyl and the like, as well as naphthyl or substituted naphthyl having one or more of the same or different substituents, such as those mentioned above; carbocyclic aryl-lower alkyl is particularly phenyl-lower alkyl, or substituted phenyl-lower alkyl having one or more than one of the same or different substituents, such as those mentioned above.

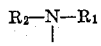

Salts of the compounds of this invention are particularly pharmaceutically acceptable, non-toxic addition salts with pharmaceutically acceptable acids, primarily those with inorganic acids, e.g., hydrochloric, hydrobromic, nitric, sulfuric, phosporic acids, as well as with organic acids, such as organic carboxylic acids, e.g., acetic, glycolic, maleic, hydroxymaleic, malic, tartaric, citric, salicylic acid and the like, or organic sulfonic acids, e.g., methane sulfonic, ethane sulfonic, 2-hydroxyethane sulfonic, p-toluene sulfonic, naphthalene 2-sulfonic acid and the like. Salts which are primarily used for identification purposes are particularly those with acidic organic nitro compounds, e.g., picric, picrolonic, flavianic acid and the like, or with metal complex acids, e.g., phosphotungstic, phosphomolybdic, chloroplatinic, Reinecke acid and the like.

Quaternary ammonium derivatives of the compounds of this invention are particularly those with reactive esters formed by hydroxylated compounds and strong acids, such as those with lower alkyl halides, e.g., methyl, ethyl, propyl or isopropyl chloride, bromide or iodide and the like, di-lower alkyl sulfates, e.g., dimethyl sulfate, diethyl sulfate and the like, lower alkyl, lower alkane sulfonates, e.g., methyl or ethyl methane sulfonate or ethane sulfonate and the like, lower alkyl monocyclic carboxylic aryl sulfonates, e.g., methyl p-toluene sulfonate and the like, phenyl-lower alkyl halides, e.g., benzyl, 1-phenylethyl or 2-phenylethyl chloride, bromide or iodide and the like, or any other suitable reactive ester compound. Also included as quaternary ammonium compounds are the quaternary ammonium hydroxides, and the quaternary ammonium compounds having as anions those of other inorganic or organic acids, such as, for example, those of the acids used for the preparation of the previously-mentioned acid addition salts.

The compounds of this invention have amine oxidase inhibiting properties of unusually prolonged duration. Pharmacological tests show, that animals pretreated with a compound of this invention, when given a catecholamine-releasing substance, i.e., a compound capable of releasing epinephrine or norepinephrine, such as, for example, reserpine or a reserpine analog, e.g., methyl 18-O-(2-tetrahydropyranyl)-reserpate and the like, show a marked increase in activity. This is due to the fact that the released catecholamines, i.e., epinephrine or norepinephrine, are not metabolized, because the compound of this invention used as the test substance inhibits the metabolizing effects of the amine oxidase. As compared with other known amine oxidase inhibiting compounds, the compounds of this invention are free from any central nervous system stimulating properties, and they do not show any effects on the blood pressure. The compounds of this invention can, therefore, be used as stimulants, particularly as psychic energizers.

Particularly outstanding amine oxidase inhibiting effects are exhibited by the compounds of the formula

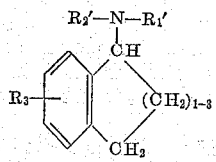

in which $R_1'$ is a 2-alkynyl radical having from three to five carbon atoms, $R_2'$ is lower alkyl having from one to four carbon atoms, and $R_3$ is hydrogen, lower alkyl having from one to four carbon atoms, halogeno having an atomic weight between 19 and 80, or trifluoromethyl, or pharmaceutically acceptable, non-toxic acid addition salts thereof. This group of compounds is represented, for example, by the compounds of the formula

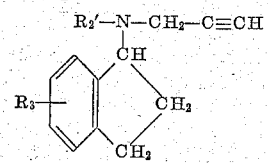

in which $R'_2$ and $R_3$ have the previously given meaning, or the pharmaceutically acceptable non-toxic acid addition salts thereof.

The compounds of this invention may be used in the form of compositions for enteral or parenteral use, which contain the new compounds in admixture with an organic or inorganic, solid or liquid carrier. For making up these preparations there may be employed substances which do not react with the essential ingredient, such as water, gelatine, lactose, starches, stearic acid, magnesium stearate, talc, vegetable oils, benzyl alcohol, stearyl alcohol, gums, propylene glycol, polyalkylene glycols or any other known carrier for such compositions. The latter may be in solid form, for example, as capsules, tablets, dragees and the like, or in liquid form for example, as solutions, suspensions, emulsions and the like. If desired, they may contain auxiliary substances, such as preserving, stabilizing, wetting, emulsifying, coloring, flavoring agents and the like, salts for varying the osmotic pressure, buffers, etc. They may also contain, in combination, other useful substances.

The compounds of this invention may be prepared according to known methods, for example by reacting a benzocycloalkane, in which the cycloalkane portion is substituted by a reactive esterified hydroxyl group, particularly a compound of the formula

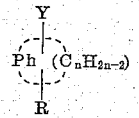

in which Ph, —$(C_nH_{2n-2})$— and R have the previously given meaning, and X stands for a reactive esterified hydroxyl group, with an N-alkynyl-amine, particularly with an amine of the formula $R_1$—NH—$R_2$, in which $R_1$ and $R_2$ have the previously given meaning, and, if desired, converting a resulting salt into the free compound or into another salt, and/or, if desired, converting a resulting compound into a salt or into a quaternary ammonium compound, and/or, if desired, converting a quaternary ammonium compound into another quaternary ammonium compound, and/or, if desired, converting a resulting mixture of isomers into the single isomers.

In the starting material used in the above reaction, the reactive esterified hydroxyl group, e.g. the group X, is a hydroxyl group esterified with a strong inorganic acid, particularly a hydrohalic acid, e.g. hydrochloric, hydrobromic, hydriodic acid and the like, as well as a strong organic sulfonic acid, such as carbocylic aryl sulfonic acid, e.g. p-toluene sulfonic, 4-bromo-benzene sulfonic, 3-nitro-benzene sulfonic acid and the like, or an aliphatic acid, e.g. methane sulfonic, 2-hydroxy-ethane sulfonic acid. The reactive esterified hydroxyl group, i.e. the group X in the above formula, is above all halogeno having an atomic weight greater than 19, e.g. chloro, bromo and the like, as well as organic sulfonyloxy, e.g. 4-methyl-phenyl-sulfonyloxy, 4-bromo-phenyl-sulfonyloxy, 3-nitro-phenyl-sulfonyloxy, methylsulfonyloxy, 2-hydroxyethyl-sulfonyloxy and the like. The reaction of the reactive ester compound with the amine is preferably carried out in the presence of an inert diluent and, if desired, in the presence of base to neutralize the generated acid, e.g. sodium or potassium carbonate or hydrogen carbonate and the like; if necessary, it is performed while cooling or at an elevated temperature, in a closed vessel and/or in the atmosphere of an inert gas, e.g. nitrogen.

The starting materials used in the above reaction are known or may be prepared according to known methods, for example, by reacting a benzocycloalkane, in which the cycloalkane portion is substituted by a hydroxyl group, with a reagent capable of converting a hydroxyl group into a reactive esterified hydroxyl group, such as a suitable phorphorus halide, a thionyl halide or an organic sulfonic acid halide, the latter in the presence of a base, e.g. pyridine.

Compounds of this invention, particularly those, in which the cycloalkane portion carries an N-alkynyl-N-substituted amino group, i.e. compounds of the previously given formula, in which $R_2$ stands for an organic radical, may also be prepared, for example, by converting in a benzocycloalkane compound, in which the cycloalkane portion is substituted by an N-substituted amino group, particularly in a compound of the formula

in which Ph, —$C_nH_{2n-2}$)— and R have the above given meaning, and $R^a_2$ stands for an organic radical, the N-substituted amino group, particularly the group of the formula

into an N-alkynyl-N-substituted amino group, particularly into an amino group of the formula

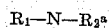

in which $R_1$ and $R^a_2$ have previously given meaning, and, if desired, carrying out the optional steps.

The above reaction is carried out, for example, by treating the starting material with a reactive ester of an alkynol, in which the triple bond is separated from the hydroxyl group by an alkylene radical. Reactive esters of such alkynols are those with strong inorganic or organic acids, such as those mentioned before; they are above all alkynyl halides, e.g. chlorides, bromides and the like, in which the triple bond is separated from halogeno by an alkylene radical, and in which halogeno represents a hydroxyl group esterified with a hydrohalic acid. Especially useful are the alk-2-ynyl halides which have from three to five carbon atoms, particularly 2-propynyl halides, as well as other lower alkynyl halides of the above type. Other reactive esters of alkynols are, for example, those with strong organic sulfonic acids, such as those previously mentioned.

The reaction of the amine with the ester is preferably carried out in the presence of a suitable diluent, e.g. acetone, ethanol, p-dioxane, tetrahydrofuran and the like, and, if desired, of a base, for example, an inorganic base, such as an alkali metal carbonate, e.g. sodium or potassium carbonate or hydrogen carbonate and the like. If necessary, it may be performed while cooling or at an elevated temperature, in a closed vessel and/or in the atmosphere of an inert gas, e.g. nitrogen.

The starting materials used in the above reaction are known or may be prepared according to known methods, for example, by reacting a benzocycloalkane compound, in which the cycloalkane portion is substituted by a reactive esterified hydroxyl group, such as the previously shown compound, with an N-substituted amine, if desired, in the presence of a basic reagent, according to the method described before. Other starting materials, in which the α-carbon atom of the substituent in an N-substituted amino group, is an aliphatic carbon atom carrying at least one hydrogen atom, may also be prepared, for example, by reacting a benzocycloalkanone with an N-substituted amine and reducing the resulting Schiff-base derivative, for example, with sodium borohydride, or by reacting a benzocycloalkane, in which the cycloalkane portion is substituted by amino, with an acylating agent, such as, for example, an organic carboxylic acid halide, e.g. chloride and the like, and converting in the resulting benzocycloalkane compound, in which the cycloalkane portion is substituted by an N-organic carbonyl-amino group (including a formylamino group, which may be formed by reacting the amino-compound with formic acid in the presence of acetic acid anhydride), the carbonyl group into a methylene group by reduction, for example, with lithium aluminum hydride and the like, or by any other suitable method.

Compounds of this invention, in which the cycloalkane portion carries an N-alkynl-N-substituted amino group and the N-substitutent in addition to the N-alkynl group is an aliphatic substitutent, i.e. compounds of the previously given formula, in which $R_2$ is an aliphatic substituent, may also be prepared, for example, by converting in a benzocycloalkane compound, in which the cycloalkane portion is substituted by an N-alkynyl-amino group, in which the triple bond of the alkynl radical is separated from the nitrogen atom by an alkylene group, particularly in a compound of the formula

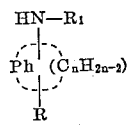

in which Ph, $—(C_nH_{2n-2})—$, $R_1$ and R have the previously given meaning, the N-alkynyl-amino group, particularly the group of the formula $HN—R_1$, into an N-alkynyl-N-aliphatic substituted amino group, particularly into an amino group of the formula $R_2{}^bNR_1$, in which $R_1$ has the previously given meaning, and $R_2{}^b$ is an aliphatic radical, and, if desired, carrying out the optical steps.

The above conversion is carried out according to known methods, for example, as previously shown, i.e. the starting material is reacted with a reactive esterified aliphatic alcohol, particularly an aliphatic halide, e.g. chloride, bromide and the like, as well as an aliphatic alcohol esterified with a strong organic sulfonic acid, e.g. p-toluene sulfonic acid and the like, if desired, in the presence of a basic reagent.

The starting material used in the above reaction is prepared according to one of the previously described methods, for example, by reacting a benzocycloalkane, in which the cycloalkane portion is substituted by a reactive esterified hydroxyl group, such as halogeno, e.g. chloro, bromo and the like, or organic sulfonyloxy, e.g. 4-methylphenyl-sulfonyloxy and the like, with an N-alkynyl-amine, in which the triple bond of the alkylyn portion is separated from the nitrogen atom by an alkylene radical, if desired, in the presence of a basic reagent, as described in detail hereinbefore.

A resulting salt may be converted into the free compound according to known methods, for example, by treating it with a base, preferably in the presence of water, such as with an alkali metal or alkaline earth metal hydroxide, an alkali metal or an alkaline earth metal carbonate or hydrogen carbonate, ammonia and the like, with a hydroxyl ion exchange preparation or with any other suitable reagent.

A resulting salt may also be converted into another acid addition salt according to known methods, for example, by treating it with a metal salt of an acid, such as a sodium, barium, silver salt and the like, in a suitable diluent in which an inorganic salt formed in the reaction is insoluble.

A free compound may be converted into its acid addition salt according to known methods, for example, by reacting the base, preferably a solution thereof in a solvent or solvent mixture, with the appropriate acid or a solution thereof, and isolating the desired salt, which may be obtained in the form of a hydrate or contain solvent of crystallization.

A compound of this invention may be converted into a quaternary ammonium derivative, for example, by reacting it with a reactive ester formed by a hydroxylated compound and a strong acid. Reactive esters are primarily those yielding lower alkyl or phenyl-lower alkyl quaternary ammonium salts, such as halides, sulfates or sulfonates. The quaternizing reaction may be performed in the absence or presence of a suitable, inert solvent, while cooling, at room temperature or at an elevated temperature, under atmospheric or increased pressure, and/or in the atmosphere of an inert gas, e.g. nitrogen. A resulting quaternary ammonium compound may be converted into another quaternary ammonium compound, such as a quaternary ammonium hydroxide, for example, by reacting a quaternary ammonium halide with silver oxide, or a quaternary ammonium sulfate with barium hydroxide, or by treating a quaternary ammonium salt with an anion exchanger, or by electrodialysis. From a resulting quaternary ammonium hydroxide there may be prepared other quaternary ammonium salts with acids, such as those mentioned for the preparation of the acid addition salts, or with mono-lower alkyl sulfates, e.g. methyl sulfate, ethyl sulfate and the like. A quaternary ammonium compound may also be converted directly into another quaternary ammonium salt without the formation of the quaternary ammonium hydroxide; for example, a quaternary ammonium iodide may be reacted with freshly prepared silver chloride or with hydrochloric acid in anhydrous methanol to yield the corresponding quaternary ammonium chloride. A quaternary ammonium salt may also be converted into another quaternary ammonium salt by treatment with an anion exchange preparation. Quternary ammonium derivatives may also be obtained in the form of the hydrates or may contain solvent of crystallization.

The new compounds of this invention may be obtained in the form of mixtures of isomers, which may be separated into the individual isomers according to known methods. Thus, racemates of compounds of this invention may be resolved into the optically active d- and l-forms according to known resolution procedures, for example, by reacting the free base of a d,l-compound, preferably a solution thereof with one of the optically active forms of an acid containing an asymmetric carbon atom. Especially useful as optically active forms of salt-forming acids having an asymmetric carbon atom are D-tartaric acid (also known as l-tartaric acid) and L-tartaric acid (also known as d-tartaric acid); the optically active forms of malic, mandelic, camphor 10-sulfonic, quinic acid or any other suitable acid, may also be employed. From the reaction mixture, a salt can be isolated, which is formed by the optically active acid with one of the optically active forms of the base. The resulting salt may be converted into the free and optically active base or into another salt according to known methods such as thouse outlined before. An optically active base may then be converted into an acid addition salt or a quaternary ammonium compound according to the previously described known procedures. The optically active forms may also be isolated by biochemical methods.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being a limitation thereon. Temperatures are given in degrees centigrade.

Example 1

To a mixture of 2.16 g. of 1-N-methylamino-indane and 1.56 g. of sodium carbonate in 30 ml. of acetone is added dropwise 1.75 g. of propargyl bromide while stirring. The reaction mixture is then refluxed for four hours, cooled and filtered. The filtrate is concentrated to a small volume and treated with a solution of hydrogen chloride in ethanol. The desired 1-N-methyl-N-propargyl-amino-indane hydrochloride of the formula.

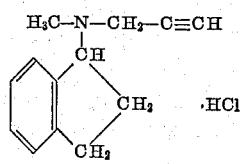

is precipitated by adding diethyl ether and is recrystallized from a mixture of ethanol and diethyl ether, M.P. 195–107°.

The starting material used in the above reaction may be prepared as follows: A mixture of 7.15 ml. of acetic acid anhydride and 3 ml. of formic acid is stirred on a water bath at 50–60° for two hours, then cooled to room temperature and, while stirring, treated dropwise with 7.0 g. of 1-amino-indane at such a rate that the temperature does not rise above 40°. Stirring is continued for an additional half-hour, and the reaction mixture is diluted with 20 ml. of diethyl ether. The diethyl ether layer is separated, washed twice with water, twice with a ten percent aqueous solution of sodium hydrogen carbonate, water, five percent hydrochloric acid and again with water, dried over magnesium sulfate and evaporated. The resulting crystalline 1-N-formylamino-indane melts at 92–95°; yield: 4.0 g.

To a suspension of 1.9 g. of lithium aluminum hydride in 30 ml. of tetrahydrofuran is added a solution of 4.0 g. of 1-N-formylamino-indane in tetrahydrofuran at a rate sufficient to maintain gentle reflux. Refluxing is then continued for five hours; the reaction mixture is allowed to stand overnight at room temperature, and is subsequently decomposed by adding with caution 2 ml. of water, 2 ml. of a twelve percent aqueous solution of sodium hydroxide and 8 ml. of water, and filtered. The filtrate is dried over magnesium sulfate and evaporated to dryness; the residue is distilled to yield the desired 1-N-methylamino-indane, B.P. 115–118°/18 mm.; yield: 2.16 g.

Example 2

To a mixture of 4.0 g. of 2-N-methylamino-indane and 2.88 g. of sodium carbonate in 50 ml. of acetone is added dropwise and while stirring 3.24 g. of propargyl bromide. The reaction mixture is then refluxed for four hours, cooled, and filtered; the filtrate is concentrated to a small volume and treated with an ethanol solution of hydrogen chloride. The 2-N-methyl-N-propargyl-amino-indane hydrochloride of the formula:

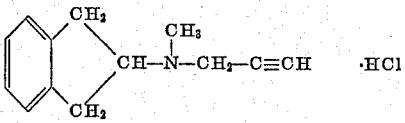

precipitates and is recrystallized from a mixture of ethanol and diethyl ether, M.P. 201–203°.

The starting material used in the above reaction is prepared according to the previously described procedure; the 2-N-formylamino-indane, P.B. 150°/0.3 mm., is converted by reduction with lithium aluminum hydride into the 2-N-methyl-amino-indane, the hydrochloride of which melts at 230–233°.

Other compounds, which may be prepared according to the previously described methods by selecting the appropriate starting materials, are for example, 1-N-(2-butynyl)-N-methyl-amino-indane, 1-N-ethyl-N-propargyl-amino-indane, 3-methyl-1-N-methyl-N-propargyl-amino-indane, 5-chloro-1-methyl-N-propargyl-amino-indane, 6-chloro-1-N-methyl-N-propargyl - amino - indane, 5,6-dichlorol-1-N-methyl-N-propargyl-amino-indane, 5-methyl-1-N-methyl-N-propargyl - amino - indane, 1-N-methyl-N-propargyl-amino-5-trifluoro-methyl-indane, 1-N-methyl-N-propargyl-amino-1,2,3,4-tetrahydro - naphthalene, 2-N-methyl-N-propargyl-amino-1,2,3,4-tetrahydro - naphthalene, 6 - chloro - 1 - N-methyl-N-propargylamino-1,2,3,4-tetrahydro - naphthalene, 7-chloro-1-N-methyl-N-propargyl-amino-1,2,3,4-tetrahydro - naphthalene, 1-N-ethyl-N-propargyl-1,2,3,4-tetrahydronaphthalene, 1-N-butynyl-N-methyl - amino - 1,2,3,4 - tetrahydro - naphthalene, 1-N-methyl-N-propargyl-amino-benzosuberane and the like, or the acid addition salts of such compounds.

What is claimed is:

1. A member selected from the group consisting of a compound of the formula

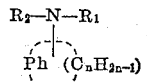

in which Ph is a 1,2-phenylene radical, the group —$(C_nH_{2n-1})$— is lower alkylene having between the 1-position and the 2-position of the 1,2-phenylene radical from three to five carbon atoms, and being substituted by

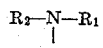

$R_1$ is lower alkynyl, in which the triple bond is separated from the nitrogen by alkylene, $R_2$ is a member selected from the group consisting of hydrogen and lower alkyl pharmaceutically acceptable acid addition salts thereof, lower alkyl quaternary ammonium salts thereof, and phenyl-lower alkyl quaternary ammonium salts thereof.

2. A member selected from the group consisting of a compound of the formula

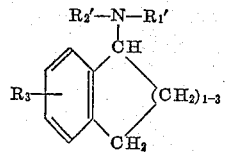

in which $R_1'$ is lower 2-alkynyl, $R_2'$ is lower alkyl, and $R_3$ is a member selected from the group consisting of hydrogen, lower alkyl, halogeno and trifluoromethyl, and a pharmaceutically acceptable non-toxic acid addition salt thereof.

3. A member selected from the group consisting of a compound of the formula

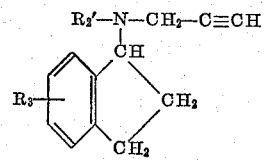

in which $R_2'$ is lower alkyl, and $R_3$ is hydrogen and a pharmaceutically acceptable non-toxic acid addition salt thereof.

4. 1-N-methyl-N-propargyl-amino-indane.

5. A pharmaceutically acceptable, non-toxic acid addition salt of 1-N-methyl-N-propargyl-amino-indane.

6. 1-N-methyl-N-propargyl-amino - indane hydrochloride.

7. 2-N-methyl-N-propargyl-amino-indane.

References Cited by the Examiner

UNITED STATES PATENTS 2,541,967  2/51  Kalloff et al. _____ 260—577 X
2,916,490  12/59  Shenck et al. _____ 260—570.5 X

OTHER REFERENCES

Burger, "Medicinal Chemistry," 2nd ed., page 597 (1960).

CHARLES B. PARKER, *Primary Examiner.*